United States Patent [19]

Desourdy

[11] 4,007,693
[45] Feb. 15, 1977

[54] TRACKLESS TRAIN SYSTEM

[76] Inventor: Bernard Desourdy, 309 de Normandie St., Longueuil, Quebec, Canada

[22] Filed: Sept. 25, 1975

[21] Appl. No.: 616,823

[30] Foreign Application Priority Data

July 11, 1975 Canada .............................. 231289

[52] U.S. Cl. .................. 105/144; 104/119; 104/138 R; 104/246; 105/364
[51] Int. Cl.² .................................. B61B 13/04
[58] Field of Search .......... 104/242, 244, 245, 246, 104/138 R, 118, 119; 105/161, 364, 144, 147, 141; 299/18; 61/84; 214/1 MS

[56] References Cited
UNITED STATES PATENTS

| | | | |
|---|---|---|---|
| 778,078 | 12/1904 | Shaules | 104/246 X |
| 1,201,429 | 10/1916 | Bager | 105/144 |
| 3,094,942 | 6/1963 | Blumel | 104/245 X |
| 3,120,197 | 2/1964 | Cirami | 104/245 |
| 3,618,531 | 11/1971 | Eichholz | 104/245 X |
| 3,774,547 | 11/1973 | Widiger et al. | 104/244 |
| 3,777,670 | 12/1973 | Blochlinger | 104/246 |
| 3,875,868 | 4/1975 | Martin, Jr. | 104/244 |

*Primary Examiner*—Frank E. Werner
*Assistant Examiner*—Randolph A. Reese

[57] ABSTRACT

A train system particularly adapted to be used in tunneling operation to outwardly move the loosened earth and rock or muck and, for that purpose, which is trackless and takes its lateral guidance from the usual utility duct which is required along the tunnel. This trackless train system also distinctively includes wagons having each a walking beam suspension which supports the load carrying ground wheels in a longitudinal central row, such that the wagon adequately and undistinctively rides on a tunnel floor which is uneven or which has a transversely concave profile, such as to form an underground conduit.

2 Claims, 5 Drawing Figures

U.S. Patent  Feb. 15, 1977  Sheet 2 of 2  4,007,693
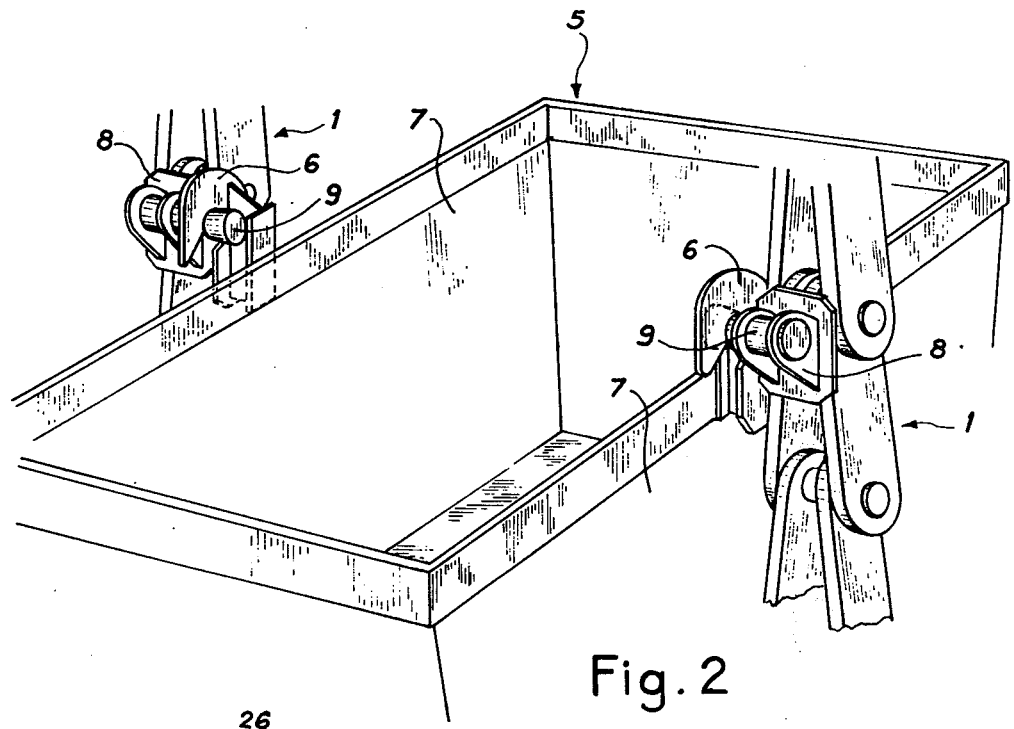
Fig. 2
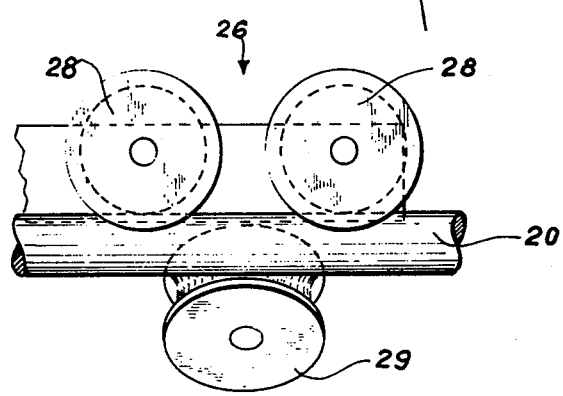
Fig. 3
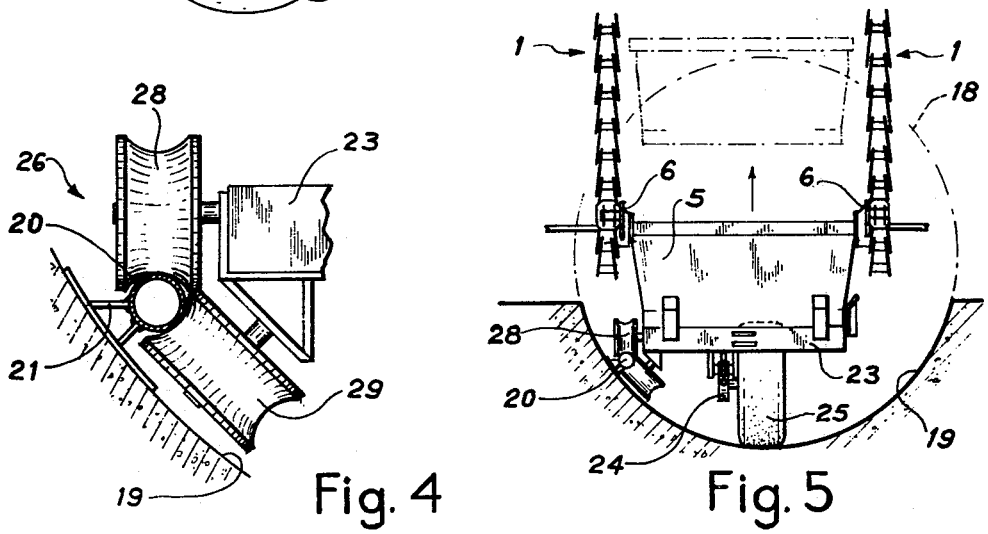
Fig. 4
Fig. 5

TRACKLESS TRAIN SYSTEM

This invention relates to a train system and, more particularly, to a train system of the type used for tunneling such as in mines or construction works.

The train systems of the above type which have been proposed so far include conventional parallel tracks and related wheels. Such train system is disadvantaged by the time and expenses associated with the use of such tracks. In tunneling operation, such need to install tracks demands valuable time. Besides, when the conduit is formed directly by the surrounding rock, the transversely concave outline of the bottom of the tunnel imposes the additional need of a platform, or the like, to carry a train of wagons conventionally having wheels on opposite sides.

It is a general object of the present invention to provide a train system which is simple and quick to install and is thus particularly suited for use as a temporary train system.

It is another general object of the present invention to provide a train system which is particularly suited for use in tunneling operation to evacuate the loosened earth and rock or muck.

It is a more specific object of the present invention to provide a train system of the trackless type and, in particular, which takes advantage of the need for a utility duct or tube to provide lateral guidance from the latter.

It is a still more specific object of the present invention to provide a trackless train system which is particularly suited for use in tunneling operation and, for that purpose, which takes advantages of the utility duct usually laid along the tunnel to laterally guide the train and also which uses a single longitudinal row of ground-engaging wheels mounted on a walking beam suspension, such as to both adequately run over the rough roadway formed by the uneven bottom of the tunnel and to suitably run along the deepest central portion of a tunnel which is formed with a transversely concave bottom.

The above and other objects and advantages of the present invention will be better understood with the following detailed description of a preferred embodiment thereof which is illustrated, by way of example, in the accompanying drawings, in which:

FIG. 2 is a perspective view illustrating the hooking of a receptacle by endless conveyor link chains;

FIG. 3 is a partial elevation view illustrating guide wheels in cooperation with a utility duct or tube forming part of the trackless train system;

FIG. 4 is a view of the guide wheels of FIG. 3 as seen from the right in the latter; and FIG. 5 is an end view of a train and an associated utility duct forming part of the trackless train system.

Figure 1:
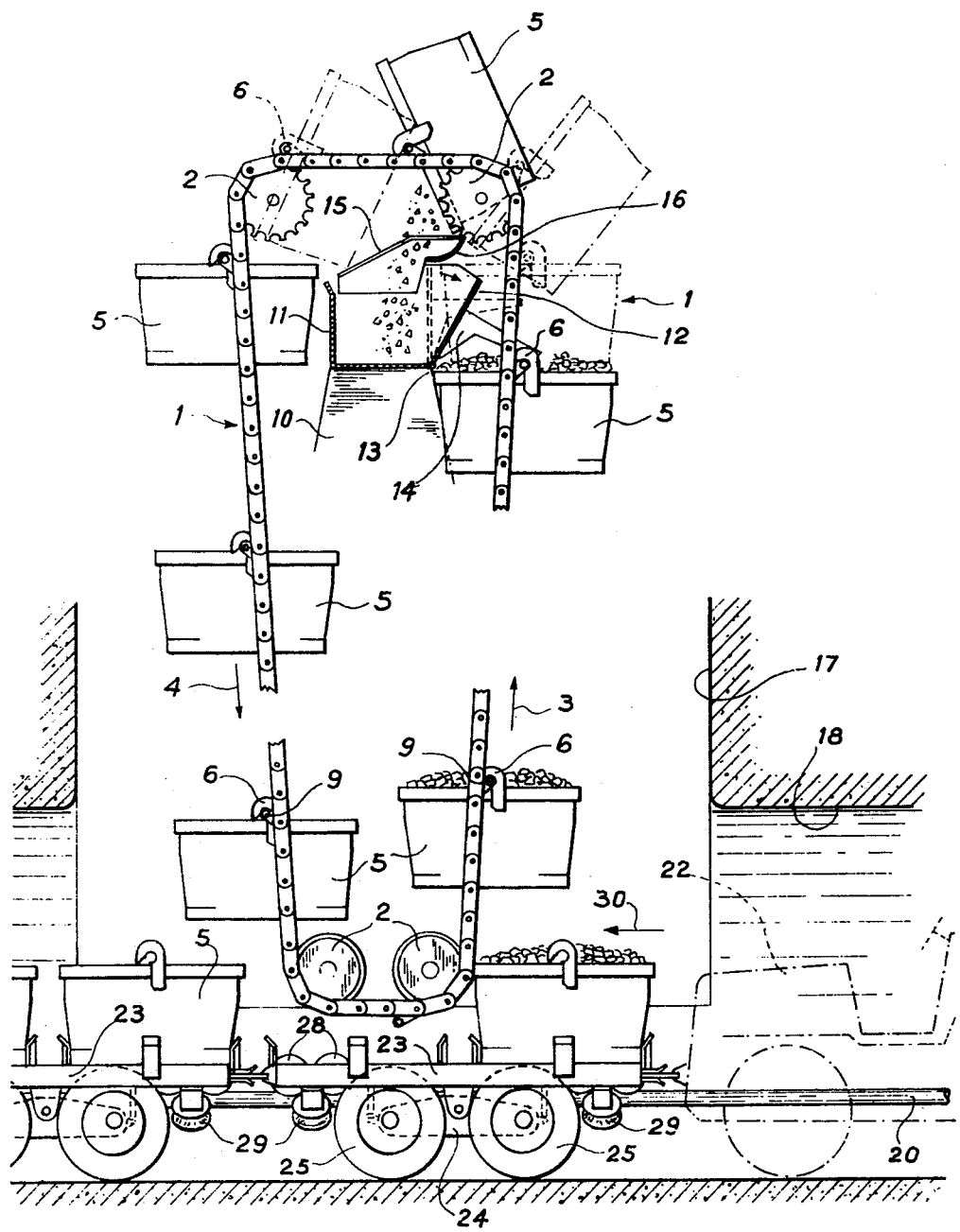
FIG. 1 is a side elevation view of a receptacle discharging system with a trackless train system according to the present invention.

The illustrated receptacle discharging system includes, in combination, a receptacle elevator and a trackless train system.

The receptacle elevator includes a pair of laterally spaced-apart endless conveyor link chains 1 formed of chain links of any suitable type, as for instance, those shown in FIG. 2. The link chains 1 are looped around sprockets 2 to define an elevating conveyor run on the side marked by the arrow 3 and a lowering conveyor run on the other side marked by the arros 4, as shown in FIG. 1.

The elevator system includes a plurality of detached or separate receptacles 5, each having a pair of hooks 6 secured to the opposite lateral side 7 thereof. Each hook 6 is rigidly secured to the corresponding side 7 and projects upwardly of the receptacle to form a downwardly opening mouth. A plurality of brackets 8 are secured in spaced-apart relationship along each link chain 1. A stud, or pin 9, is mounted on each bracket 8 and projects laterally inward relative to the receptacle elevator. Each stud, or pin 9, of one endless link chain 1 is transversely aligned and coupled with a corresponding stud, or pin 9, of the other endless conveyor link chain. Each pair of coupled studs 9 are laterally spaced apart in predetermined spacing relationship to register with the pair of hooks 6 of any receptacle 5 and thus pivotally engage in the hooks.

A chute 10 is operatively combined with the receptacle elevator to discharge the receptacles 5 therein. The chute 10 includes an upper head end 11 positioned between the upper end of the conveyor runs identified by the arrows 3 and 4. The chute 10 extends downwardly and outwardly from the head end 11. The latter includes a pivoting side wall portion, or panel 12, which is hinged at its bottom edge 13 to the remainder of the head end, such as to outwardly pivot downwardly and thus increase the breadth of the opening defined by the head end 11. A control arm 14 is rigidly secured to the outside face of the pivoted side wall portion 12 and extends from the latter to stand in the path of an upcoming receptacle. In particular, the control arm 14 intercepts one stud, or pin 9, of an upcoming receptacle 5 to be displaced by the latter and close the pivoted side wall portion 12, until passage of the corresponding stud 9 off the free end of the arm 14, as may be understood from FIG. 1.

A receptacle tripper wire 15 is fixed above the head end 11 of the chute 10 and is bent to have a profile which produces tipping over of the uncoming loaded receptacle and pivoting back to normal upright position after discharge of the muck into the chute 10. For this purpose, the profiled wire 15 has a bent portion 16 of studied curvature to produce timely tipping-over of the receptacle.

The afore-described receptacle elevator may have different applications but it is particularly suited to be used in the shaft 12 of a tunnel 18 which is under construction, such as to evacuate the muck through the chute 10 installed at ground level. In this particular instance, the tunnel 18 is drilled to form a transversely concave bottom 19 which may be substantially uneven at least on part of the length thereof close to the end being drilled.

The present invention also defines a trackless train system particularly adapted to be efficiently used in such tunnel operation to evacuate the muck. This trackless train system includes a duct, or tube 20, which is fixed by appropriate supports 21 to constitute a lateral guide rail laid along the tunnel 18 substantially to one side of the latter. The duct 20 conventionally contains the utility lines, such as for electricity, water, etc., as needed for the tunneling operation.

The trackless train system also includes a train of interconnected cars or wagons displaced by a motor unit 22, as seen in FIG. 1. Each wagon includes a frame or chassis 23 forming a platform to removably carry a pair of receptacles 5. Each frame, or chassis 23, is rollably carried by a walking beam suspension including a walking beam 24. A pair of load carrying ground wheels 25 are carried by the ends respectively of the walking beam 24 and are longitudinally aligned into a single row extending lengthwise centrally of the tunnel 18, such as to roll on the deepest portion of the transversely concave bottom 19.

On the side of each wagon adjacent to the utility duct 20, there is provided a pair of lateral guide assemblies 26, one of which being shown in most details in FIGS. 3 and 4. Each lateral guide assembly includes a pair of lateral guide wheels, or rollers 27, rolling on the top of the duct 20 and an intermediate guide wheel, or roller 28, rolling against the bottom of the duct 20, such as to positively laterally guide the corresponding car or wagon.

As may be noted from FIG. 1, the link chains 1 extend lower than the hooks 6 of the receptacles 5 on the wagons of the train; the latter is displaced in a direction coplanar with the space between the two link chains 1, and the loaded receptacles 5 travel in the direction of the arrow 30 toward the lower end of the elevating conveyor run with the hooks 6 open toward the latter.

Upon appropriate stopping of a loaded receptacle 5, a pair of transversely coupled studs, or pins 9, engages the corresponding hooks 6 and lift this receptacle which is discharged and lowered back onto a wagon by disengagement of the pins from the hooks.

What I claim is:

1. A transportation system for the evacuation of muck from a tunnel of substantially circular cross-section is a tunneling operation, said tunnel including a utility pipe secured to the wall of the tunnel and extending substantially parallel to the deepest longitudinal portion of the tunnel laterally of said portion and at a substantially constant level above the same, said transportation system comprising a train of interconnected cars, each car including a horizontally disposed frame, at least one open top much-receiving receptacle carried by said frame, a pair of load carrying wheels disposed in a single longitudinal row along the centre line of the frame below the same and adapted to run on suspension connecting the pair of load carrying wheels to the car frame, brackets extending from both end portions of the car frame laterally from one side only of the car frame, and sets of guide wheels rotatably carried by each bracket, said guide wheels having a peripheral groove for receiving said pipe in rolling engagement therewith, first guide wheels of each set rolling on the top of the pipe and second guide wheels of the set rolling along the bottom of the pipe, said guide wheels laterally guiding the corresponding car along the deepest longitudinal portion of the tunnel and preventing lateral and longitudinal tilting of the car.

2. A transportation system as claimed in claim 1, wherein each car frame carries a pair of open top muck-receiving receptacles disposed in a single row longitudinally of the frame and removably carried by said frame so that they can be lifted from the car frame.

* * * * *